United States Patent
Madej et al.

(10) Patent No.: US 8,579,198 B2
(45) Date of Patent: Nov. 12, 2013

(54) ENHANCED LASER BARCODE SCANNING

(75) Inventors: Dariusz Madej, Shoreham, NY (US); Bruno Vande Vyvre, Westhampton, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 12/957,503

(22) Filed: Dec. 1, 2010

(65) Prior Publication Data

US 2012/0138686 A1 Jun. 7, 2012

(51) Int. Cl.
*G06K 7/00* (2006.01)

(52) U.S. Cl.
USPC ............... 235/462.25; 235/454; 235/462.01; 235/462.36

(58) Field of Classification Search
USPC .......... 235/435, 454, 462.01, 462.32, 462.33, 235/462.36, 462.38, 462.25
See application file for complete search history.

(56) References Cited

U.S. PATENT DOCUMENTS

| | | | | |
|---|---|---|---|---|
| 5,107,100 A | * | 4/1992 | Shepard et al. | 235/472.01 |
| 5,148,008 A | * | 9/1992 | Takenaka | 235/455 |
| 5,557,093 A | * | 9/1996 | Knowles et al. | 235/462.32 |
| 5,591,953 A | * | 1/1997 | Rockstein et al. | 235/462.31 |
| 5,637,852 A | * | 6/1997 | Knowles et al. | 235/462.14 |
| 5,777,315 A | * | 7/1998 | Wilz et al. | 235/462.15 |
| 6,776,342 B1 | * | 8/2004 | Thuries et al. | 235/462.15 |
| 6,857,572 B2 | * | 2/2005 | Martin et al. | 235/462.45 |
| 6,873,435 B1 | * | 3/2005 | Tehranchi et al. | 358/1.9 |
| 6,905,071 B2 | * | 6/2005 | Schmidt et al. | 235/462.45 |
| 7,065,255 B2 | * | 6/2006 | Chen et al. | 382/260 |
| 7,097,105 B2 | * | 8/2006 | Wilz et al. | 235/462.45 |
| 7,240,841 B2 | * | 7/2007 | Kelley et al. | 235/462.01 |
| 7,797,740 B2 | * | 9/2010 | Blom et al. | 726/21 |
| 2003/0206231 A1 | * | 11/2003 | Chen et al. | 348/207.99 |
| 2007/0119941 A1 | * | 5/2007 | He | 235/462.15 |
| 2010/0198876 A1 | * | 8/2010 | Estok | 707/793 |

* cited by examiner

*Primary Examiner* — Daniel Hess
*Assistant Examiner* — Paultep Savusdiphol
(74) *Attorney, Agent, or Firm* — Randi L. Karpinia; Michael J. Giannetta

(57) ABSTRACT

A laser scanning device is described. The device includes a laser for projecting a light beam. A mirror is optically coupled to the laser. The mirror reflects the light beam onto a target. A detector generates an analog signal in response to detecting a reflection of the light beam from the target. A processor is capable of modifying a scanning parameter of the laser scanning device. The processor processes the analog signal to generate a digital bar pattern and can embed the scanning parameter in the digital bar pattern.

22 Claims, 5 Drawing Sheets

ENHANCED LASER BARCODE SCANNING

TECHNICAL FIELD

The invention relates generally to laser-based barcode scanning or linear imager bar code scanning and enhancing decode capability during target capture.

BACKGROUND

Un-decoded laser scan engines and un-decoded linear imager scan engines typically generate a so-called digital bar pattern (DBP) signal that is transmitted to a decoder system. The DBP signal corresponds to barcode data that the decoder system decodes. The DBP is a digital signal having varying pulse widths of corresponding consecutive bar code elements (i.e., bars and spaces). Generally, the DBP can also contain additional elements, such as an element corresponding to a clear margin around the bar code as well as other graphical elements in the field of view of a scanner (e.g., lines, text, and random objects, etc).

SUMMARY

In one aspect, the invention is embodied in a laser scanning device. The device includes a laser for projecting a light beam. A mirror is optically coupled to the laser. The mirror reflects the light beam onto a target. A detector generates an analog signal in response to detecting a reflection of the light beam from the target. A processor is capable of modifying a scanning parameter of the laser scanning device. The processor processes the analog signal to generate a digital bar pattern and embeds the scanning parameter in the digital bar pattern.

In one embodiment, a memory is coupled to the processor for storing the scanning parameter. The target can include an image of a barcode. The scanning parameter can include scan angle, bar code digitization method, AGC control method, AGC control gain, noise filter type, and cut-off frequency, for example. In one embodiment, the mirror is a movable mirror. In one embodiment, embedding the scanning parameter in the digital bar pattern includes appending metadata representing the scanning parameter to the digital bar pattern.

The processor can include an analog to digital (A/D) converter or a hardware digitizer. In one embodiment, the digital bar pattern with the embedded scanning parameter is decodable by a host that is unaware of the presence of the scanning parameter. The data generated by a scanner for purpose of decoding has a form of a digital bar pattern (DBP). In addition to the digital bar pattern, the scanner can transmit the scanning parameter to a decoder. In one embodiment, the scanning parameters are embedded into the DPB data stream.

In one embodiment, the digital bar pattern with the embedded scanning parameter is decodable by a host that is capable of extracting the scanning parameter. The host is capable of instructing the processor to modify the scanning parameter in response to decoding the digital bar pattern.

In another aspect, the invention is embodied in a system. The system includes a target. A scanning device having a scanning parameter scans the target to generate an analog signal. The analog signal is converted to a digital bar pattern that is combined with the scanning parameter. A host decodes the digital bar pattern and extracts the scanning parameter. The host is capable of instructing the scanning device to modify the scanning parameter in response to decoding the digital bar pattern. The scanning device can be a laser scanning device or a linear imager scanning device.

In one embodiment, the system also includes a memory coupled to the laser scanning device. The scanning parameter can include scan angle, bar code digitization method, AGC control method, AGC control gain, noise filter type, and cut-off frequency. In one embodiment, the host is integrated with the laser scanning device. The target can include an image of a barcode. In one embodiment, combining the scanning parameter in the digital bar pattern includes appending metadata representing the scanning parameter to the digital bar pattern.

In yet another aspect, the invention is embodied in a method for scanning a target. The method includes scanning a target with a scanning device having a scanning parameter. An analog signal is generated in response to scanning the target. The analog signal is converted to a digital bar pattern. The scanning parameter is embedded in the digital bar pattern. The digital bar pattern is decoded. The scanning parameter is extracted. The scanning device can be a laser scanning device or a linear imager scanning device.

In one embodiment, the scanning parameter is modified in response to decoding the digital bar pattern. The scanning parameter can include scan angle, bar code digitization method, AGC control method, AGC control gain, noise filter type, and cut-off frequency.

In one embodiment, the scanning parameter is stored in a memory. The target can include an image of a barcode. The laser scanning device can include a movable mirror. In one embodiment, embedding the scanning parameter in the digital bar pattern includes appending metadata representing the scanning parameter to the digital bar pattern.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional laser-based scanning, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to systems utilizing laser scanners and un-decoded linear imager scanners. In an exemplary embodiment, a laser scanning device includes a laser for projecting a light beam. A detector generates an analog signal in response to receiving a reflection of the light beam from the target. A processor modifies a scanning parameter of the laser scanning device. The processor processes the analog signal to generate a digital bar pattern and combines the digital bar pattern with the scanning parameter. It should be noted that references to un-decoded laser scan engines in the description are merely exemplary. The systems and methods described herein can also apply to other un-decoded data capture devices, such as an un-decoded linear imager scan engine, for example.

Figure 1:
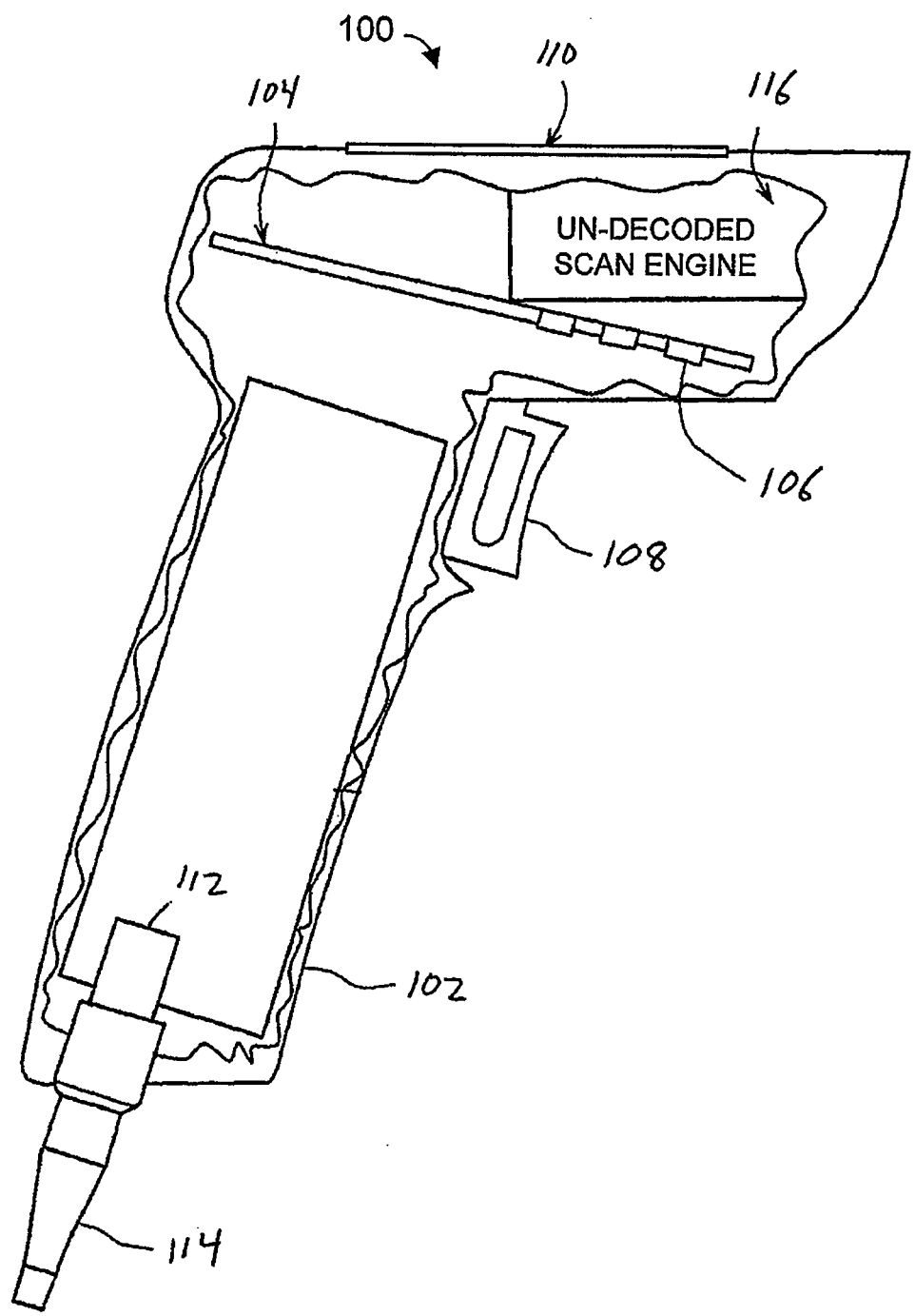
FIG. 1 illustrates a barcode scanning device according to one embodiment of the invention.

FIG. 1 illustrates a scanning device 100 according to one embodiment of the invention. The scanning device 100 is one example of a data capture device having a laser according to the invention. The scanning device 100 can also be a mobile computer (not shown) having scanning capability. The scanning device 100 includes a housing 102. The housing 102 contains electronic components, such as processing circuitry 104 including a processor 106 as further described with relation to FIG. 2 to enable the device 100 to scan a target. The housing 102 can also contain I/O devices such as a trigger 108, a display 110 (e.g., LCD) that displays information about the device 100, a port 112, such as a universal serial bus (USB) port for receiving a cable 114, soft and/or hard keys, a touch screen, and/or a jog wheel. The scanning device 100 can also include an un-decoded scan engine 116 for scanning a target barcode located in a field of view of the un-decoded scan engine 116. The un-decoded scan engine 116 can be a laser-based scan engine or an un-decoded linear imager scan engine. In some embodiments, the device 100 includes more or less than all of the I/O devices shown in FIG. 1.

Figure 2:
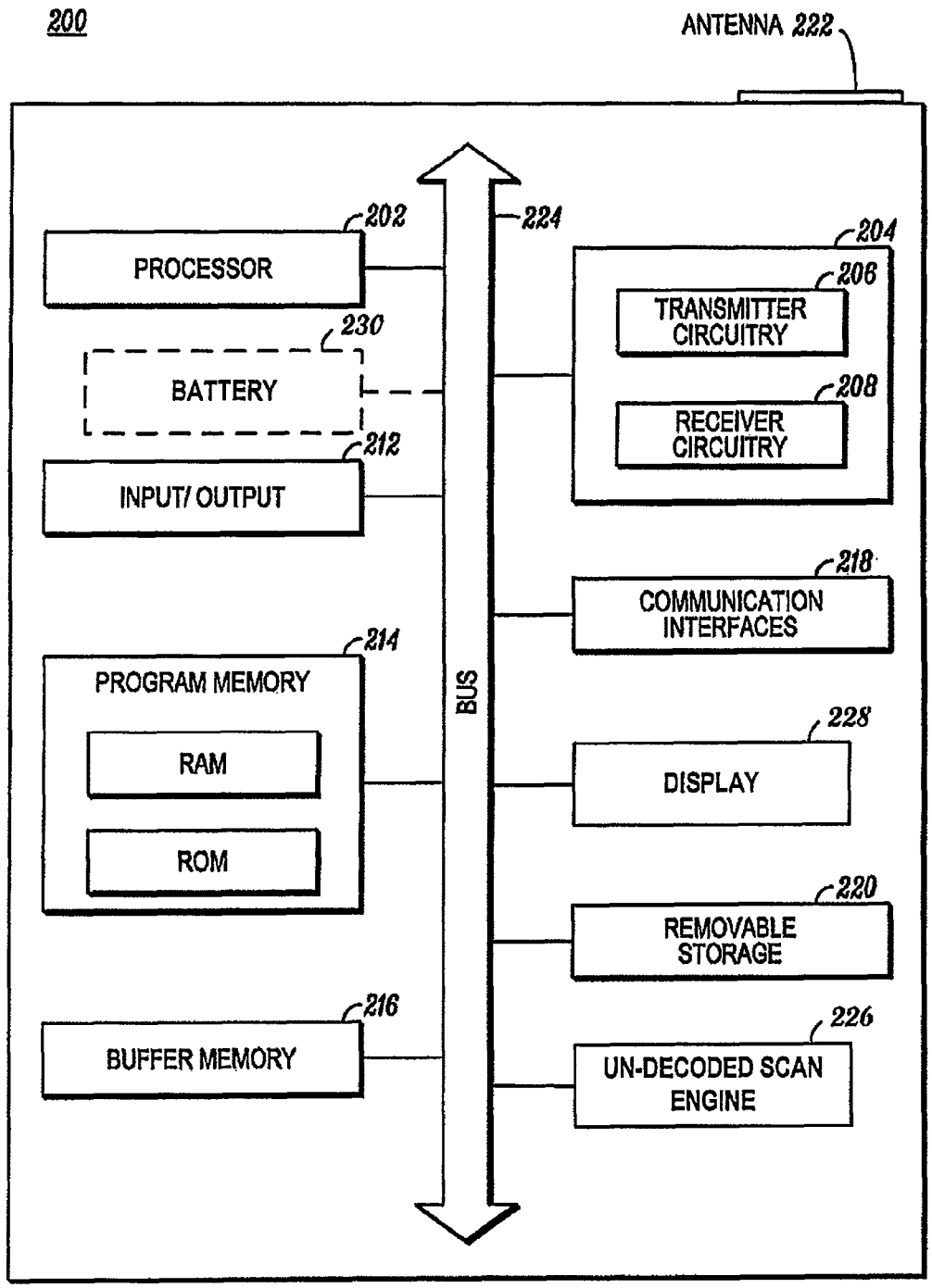
FIG. 2 is a block diagram illustrating the electronic components of the barcode scanning device of FIG. 1.

FIG. 2 is a block diagram 200 illustrating the electronic components of the scanning device 100 (FIG. 1) according to the invention. The scanning device 100 contains, among other components, a processor 202, the I/O devices 212 described in relation to FIG. 1, a program memory 214 for storing operating instructions that are executed by the processor 202, a buffer memory 216, one or more communication interfaces 218, and an un-decoded scan engine 226. The un-decoded scan engine 226 can be a laser-based scan engine or an un-decoded linear imager scan engine. The device 100 can also include an optional display 228 for displaying information and data. In one embodiment, the device 100 includes a battery 230 and a transceiver 204. The transceiver 204 can include transmitter circuitry 206 and receiver circuitry 208. The device 100 is preferably an integrated unit containing the elements depicted in FIG. 2, as well as any other element necessary for the scanning device 100 to function. In one embodiment, the electronic components are connected by a bus 224.

The processor 202 can include one or more microprocessors, microcontrollers, DSPs, state machines, logic circuitry, analog to digital (A/D) converters, hardware digitizers, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry. Operations performed by the processor 202 as well as the scanning device 100 are described in detail below.

The optional transmitter circuitry 206 and the optional receiver circuitry 208 enable the scanning device 100 to respectively transmit and receive communication signals. In this regard, the transmitter circuitry 206 and the receiver circuitry 208 can include circuitry to enable wireless transmissions. The implementations of the transmitter circuitry 206 and the receiver circuitry 208 depend on the implementation of the scanning device 100 and the devices with which it is to communicate. For example, the transmitter 206 and receiver circuitry 208 can be implemented as part of the communication device hardware and software architecture in accordance with known techniques. One of ordinary skill in the art will recognize that most, if not all, of the functions of the transmitter 206 or receiver circuitry 208 can be implemented in a processor, such as the processor 202. However, the processor 202, the transmitter circuitry 206, and the receiver circuitry 208 have been partitioned herein to facilitate a better understanding of the functions of these elements. In one embodiment, the scanning device 100 can include an antenna 222, such as a local area network (LAN) antenna coupled to the transceiver 204.

The buffer memory 216 may be any form of volatile memory, such as RAM, and is used for temporarily storing information received from the un-decoded scan engine 226, for example. The removable memory 220 can be a secure digital (SD) memory card, for example.

The un-decoded scan engine 226 is controlled by the processor 202. The processor 202 issues commands executed by the un-decoded scan engine 226 via the program memory 214. In one embodiment, the program memory 214 is implemented within a field programmable gate array (FPGA); however the program memory 214 may also be implemented in other devices. The un-decoded scan engine 226 generates an analog signal that is converted to a digital bar pattern signal. The digital bar pattern represents the un-decoded barcode. The program memory 214 stores the resulting digital bar pattern signal in a memory module. The memory module stores the digital bar pattern data prior to the processor 202 processing the digital bar pattern or displaying decoded data on a display 110 (FIG. 1), such as liquid crystal display (LCD).

In one embodiment, the un-decoded scan engine 226 is a laser scan engine. In operation, the laser scan engine scans a target by directing laser light onto a target barcode. In one embodiment, the laser scan engine includes a movable mirror coupled to a laser. The mirror reflects the laser light onto a target barcode. A detector generates an analog signal in response to detecting the laser light beam reflected from the target barcode. A processor converts the analog signal to a digital bar pattern signal. The digital bar pattern represents the un-decoded barcode.

This process begins when the processor 202 issues a command instructing the laser scan engine to scan the target. Once the target barcode is scanned, the processor 202 generates a digital bar pattern from the scanned signal. The processor 202 can include an analog to digital (A/D) converter or a hardware digitizer, for example. The laser scan engine scans the target using certain scanning parameters. For example, the scanning parameters can include scan angle, bar code digitization method, automatic gain control (AGC) method and gain level, noise filter type and cut-off frequency, and any other parameters affecting the scanning properties of the laser scan engine. It should be noted that although the scanning parameters may be different, the principles described herein also apply to an un-decoded linear imager scan engine.

The processor 202 then embeds one or more of the scanning parameters in the digital bar pattern. The digital bar pattern including the embedded scanning parameter is transmitted to a host capable of decoding the digital bar pattern. In one embodiment, the host is also capable of extracting the scanning parameter from the digital bar pattern. The host can utilize the scanning parameter to improve the decoding process. Alternatively, the host can modify the scanning parameter and update the laser scan engine with the modified scanning parameter to improve decoding from subsequent barcode scans.

For example, in a mobile computer equipped with un-decoded scan engine, the bar code decoder runs on a mobile computer (host) processor. However, the host is unaware of essential information about the scanning conditions/parameters that can be important to the decoding process. In one case, a digital bar pattern representing a scanned bar code having a weak signal can result from a signal having a low signal-to-noise ratio. Thus, the host decoder can adjust decoding rules to minimize decoding error in this situation. In another example, a digital bar pattern that is generated by a high blur digitizer can require redundancy during the decoding process, while a digital bar pattern obtained by an edge-based digitizer may not require redundancy during the decoding process.

Figure 3:
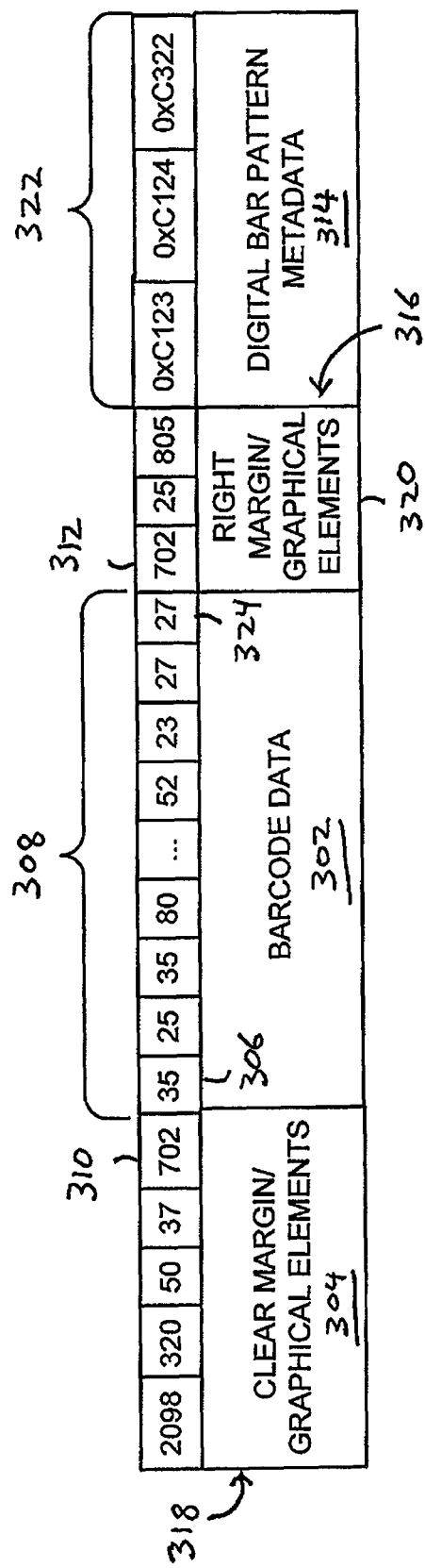
FIG. 3 illustrates barcode elements of a digital bar pattern according to one embodiment of the invention.

FIG. 3 illustrates barcode elements of a digital bar pattern 300 according to one embodiment of the invention. As previously described, an un-decoded laser scan engine typically transmits a so-called digital bar pattern (DBP) to a host decoder system. The digital bar pattern signal corresponds to bar code data 302 that has yet to be decoded. Specifically, the digital bar pattern 300 is a digital signal having various pulse widths that correspond to widths of consecutive bar code elements (i.e., bars and spaces). Generally, the digital bar pattern 300 also includes additional elements. For example, the pattern 300 can include elements that emerge from the clear margin around the bar code and other graphical elements in the field of view of a scanner, such as lines, text, and random objects.

According to the invention, one or more scanning parameters of an un-decoded laser scan engine can be embedded in the digital bar pattern data signal. The scanning parameters embedded in the digital bar pattern can be referred to as metadata.

The metadata representing the scanning parameters can be formatted in such a way that normal bar code decoding is not affected by the presence of the metadata. For example, the metadata can be transparent to a host that is unaware that the metadata is integrated with the digital bar pattern data. However, the metadata can be formatted such that it can be reliably extracted by a host configured to extract and utilize the metadata. Thus, the inclusion of the metadata into the digital bar pattern data signal should have no adverse effect on the decoding of the bar code, even if the decoder system is designed to utilize the metadata.

The exemplary digital bar pattern 300 of FIG. 3 represents a Universal Product Code (UPC) bar code according to the invention. The digital bar pattern 300 contains, in addition to actual bar code data, clear left margin data 304 around the bar code as well as some additional graphical elements that were in the field of view of the laser scan beam and left of the scanned barcode.

In general, the first element 306 in the digital bar pattern represents a space. The decoder typically identifies the margins of the barcode by assuming that elements 308 in the center of the digital bar pattern 300 represent the barcode data 302. The decoder then identifies the two large space-elements 310, 312 on each side of the barcode that is clear left and right margin. Thus, large digital bar pattern (DBP) elements 310, 312 are understood to be external to the barcode data 302. These elements can be used to convey additional information. In one embodiment, so as not to confuse the decoder, the metadata 314 is formatted as larger elements in the digital bar pattern 300. The formatting of the metadata 314 ensures compatibility with existing decoders that are not metadata aware.

In one embodiment, the metadata 314 is be added at the end 316 of the digital bar pattern 300 rather than at the beginning 318 of the pattern. In this embodiment, the metadata 314 appears as additional elements behind the right margin 320 of the digital bar pattern 300. Certain symbology decoders, unaware of the metadata 314, compute the cumulative sum of DBP elements as part of the decoding process. Metadata 314 positioned behind the right margin 320 of the digital bar pattern 300 would not be included in the cumulative sum. Thus, positioning several large elements behind the right margin 320 of the digital bar pattern 300 will have no effect on decoding when the cumulative sum of DBP elements is computed. An arithmetic overflow could result if the metadata 314 was located at the beginning 318 of the DBP 300 when the cumulative DBP was computed.

In one embodiment, each element 322 of the metadata set 314 can be marked with a specific bit pattern embedded inside it that would allow the host to distinguish the metadata element 314 from any large random elements that may be present behind the right margin 320. In one embodiment, a counter or a check sum can be included for increased consistency.

As previously described, the metadata 314 can be inserted in such a way that the integrity of the digital bar pattern (DBP) is maintained. For example, certain laser scanners generate the DBP such that the first 306 and the last elements 324 represent spaces. Additionally, the number of digital bar pattern (DBP) elements is an odd number. These properties of the DBP data should be maintained after the metadata 314 is embedded in the DBP 300.

The set of metadata elements 322 is composed of three 16-bit numbers that are large. Thus, the host decoder will interpret these elements as extraneous to the barcode elements 308. For example, the first digit of each of the metadata elements 322 can be a "C" (12 in hexadecimal code) corresponding to a metadata marker. The remaining data constitute a 36-bit data file that can encode the following information, for example:
- number of DBP elements in metadata (3 bits);
- checksum (8 bits);
- scan angle (2 bits);
- digitizer type (4 bits);
- gain (8 bits);
- range finder (1 bit);
- noised filter type (2 bits); and
- noise filter cut-off frequency (4 bits).

In practice, the metadata 314 representing the scanning parameters can include any data relating to any scanning parameter of the scan engine. The decoder can be programmed to recognize to presence of the metadata and utilize the metadata to improve the decode process by either modifying the decode process in response to the metadata and/or modifying a scanning parameter for subsequent scans. Thus, embedding the metadata representing the scanning parameters provides the decoder with real time information about a particular scan, thereby improving the decoding process.

Embedding the metadata 314 into the digital bar pattern 300 can be useful for decoders using a digital bar pattern count method. In the digital bar pattern count method, the count of the element width is transmitted in a numerical form to the decoder. As described above the metadata 314 relating to a specific scan could be appended behind the right margin of the DBP 300 of that particular scan. By using the method described herein, the decoder can decode the digital bar pattern 300 without the risk of losing synchronization with the actual capture parameters of the scanned barcode.

Figure 4:
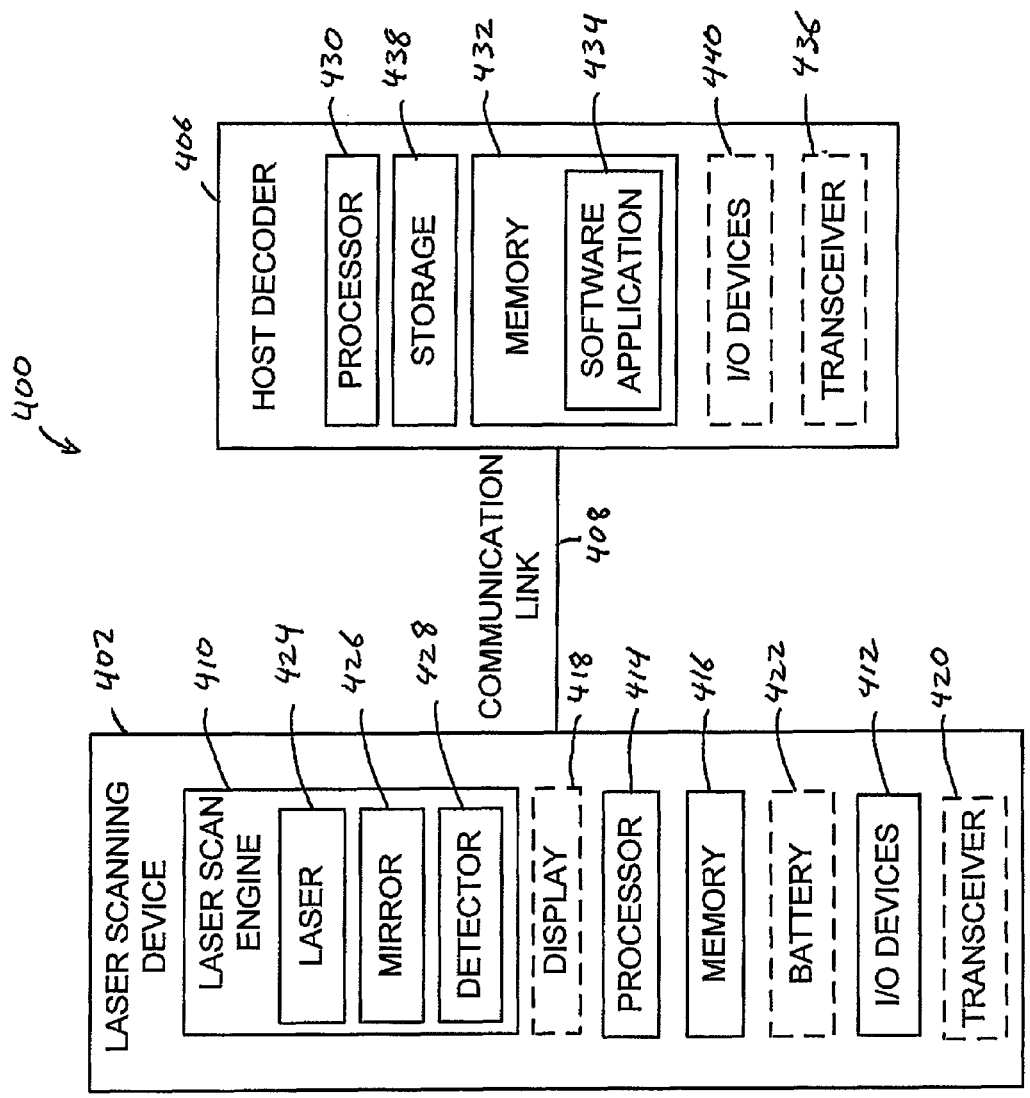
FIG. 4 is a block diagram of a system according to the present invention.

FIG. 4 illustrates a block diagram of one embodiment of a scanning system 400 according to the invention. In this exemplary system 400, the scan engine is a laser-based scan engine. The system 400 includes a laser scanning device 402, a host decoder 406, and a communication link 408 that couples the device 402 and the host 406 together.

The laser scanning device 402 includes an un-decoded scan engine 410, one or more I/O devices 412, a processor 414, and a memory 416. The laser scanning device 402 can optionally include a display 418, a transceiver 420 for communicating with a network, and a battery 422 for wireless operation. The battery 422 provides power to the electronic components of the device 402. The battery 422 can be a rechargeable battery, such as a lithium ion, nickel metal hydride, or nickel cadmium, for example.

The un-decoded scan engine 410 includes a laser 424, a movable mirror 426 and a detector 428. The laser 424 generates a laser beam that is reflected from the mirror 426. The mirror 426 moves rapidly thereby creating a scanning pattern that is directed towards a target barcode. The detector 428 receives light reflected from the barcode and generates an analog signal. The processor 414 converts the analog signal to a digital bar pattern signal. The memory 416 can store instructions for the processor 414 to execute. In one embodiment, the processor 414 and the memory 416 can be integrated with the laser scan engine 410.

The optional display 418 can display information relating to the laser scanning device 402, product information, or any other suitable data. The I/O devices 412 can include a trigger, keypad, touch screen, or any other suitable input device.

The host decoder 406 can be coupled to the laser scanning device 402 through the communication link 408. The communication link 408 can be wired or wireless. In one embodiment, the host decoder 406 is integrated with the laser scanning device 402.

The host decoder 406 can include a processor 430 and a memory 432. The memory 432 stores instructions, such as a software application 434, for execution on the processor 430. The memory 432 can also store product information, for example. The host decoder 406 can also include an optional transceiver 436, a removable storage 438 and I/O devices 440.

The host decoder 406 decodes the digital bar pattern received from the laser scanning device 402 and extracts the scanning parameter from the metadata embedded in the digital bar pattern. The host decoder 406 can improve the decode process by modifying the decode process in response to the scanning parameter. In one embodiment, the host decoder 406 can modify the scanning parameter and update the laser scanning device 402 with the modified scanning parameter. The modified scanning parameter modifies a scanning property of the laser scan engine 410, such that subsequent scans are decoded with increased efficiently and accuracy by the host decoder 406. This feedback process can continue for subsequent scans and decodes.

Figure 5:
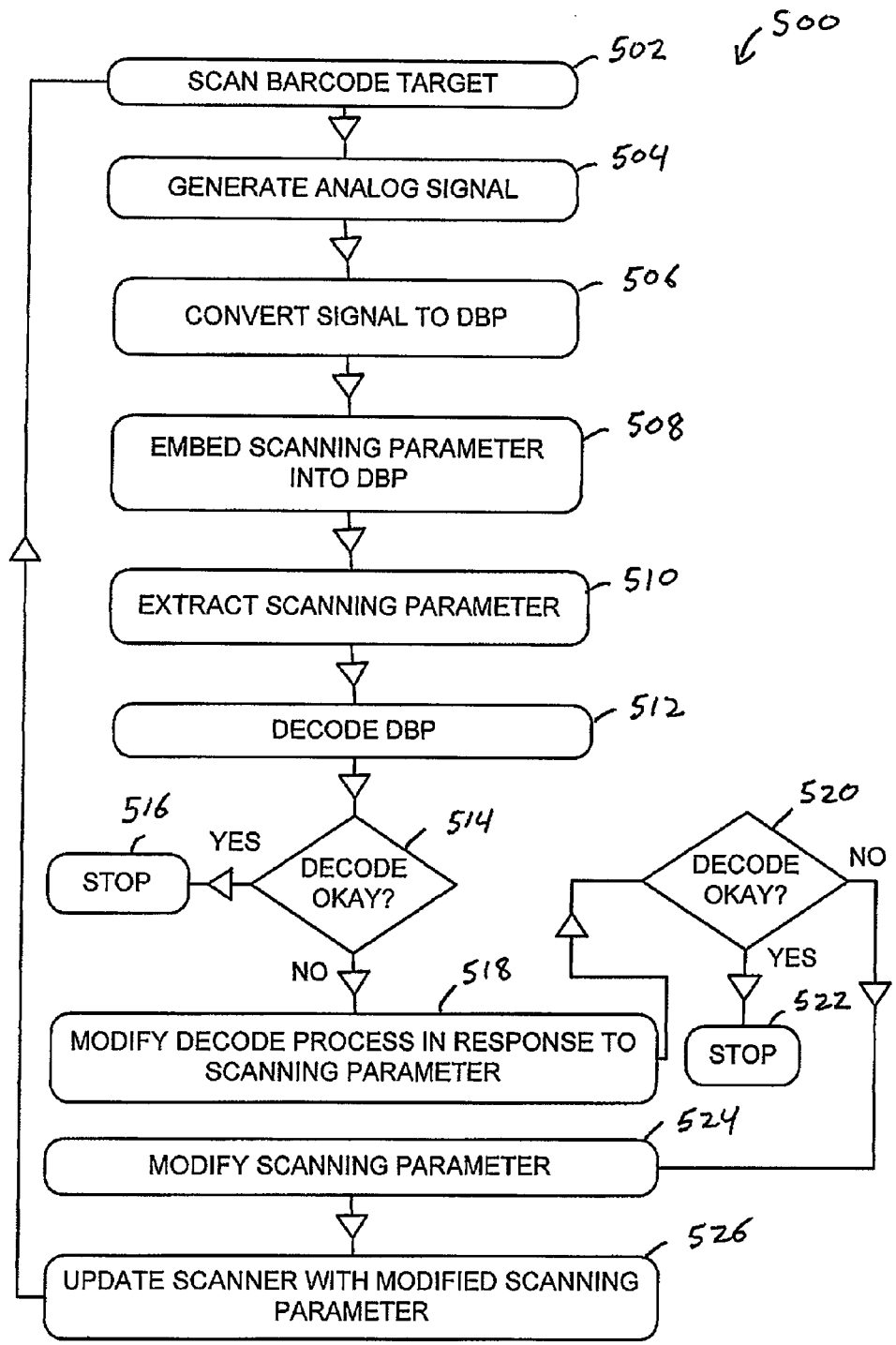
FIG. 5 illustrates a flowchart of a method for scanning a target according to one embodiment of the invention.

FIG. 5 illustrates a flowchart 500 of a method for scanning a target according to one embodiment of the invention. In step 502, an un-decoded scanning device scans a target. The un-decoded scanning device includes a scanning parameter. An analog signal is generated by a detector of the scanning device (step 504) in response to scanning the target. The analog signal is converted to a digital bar pattern in step 506. The scanning parameter is embedded in the digital bar pattern (step 508). In one embodiment, a processor coupled to the scanning device can embed the scanning parameter in the digital bar pattern.

The host extracts the scanning parameter in step 510. The digital bar pattern is decoded by a host in step 512. The host can be a remote computer, or alternatively, the host can be integrated with the scanning device. In one embodiment, the host can ignore the extracted scanning parameter if the decode process efficiently decodes the digital bar pattern without requiring knowledge of the scanning parameter.

The host determines whether the decode process was error-free and/or efficiently performed (step 514). In the event that the decode process was error-free, the process is complete (step 516). In the event that the decode process was not efficiently performed, the host modifies the decode process in response to information extracted from the scanning parameter (step 518).

The host determines whether the decode process was error-free and/or efficiently performed in response to the information extracted from the scanning parameter (step 520). In the event that the decode process was suitably improved, the process is complete (step 522). In the event that the efficiency of the decode process did not improve, the host then modifies the scanning parameter (step 524). The host can use information collected from previous decodes to modify the scanning parameter. The processor updates the scanning device with the modified scanning parameter (step 526).

In general, the processor includes processing logic configured to carry out the functions, techniques, and processing tasks associated with the operation of the scanning device. Furthermore, the steps of a method or algorithm described in connection with the embodiments disclosed herein may be embodied directly in hardware, in firmware, in a software module executed by the processor, or any combination thereof. Any such software may be implemented as low level instructions (assembly code, machine code, etc.) or as higher-level interpreted or compiled software code (e.g., C, C++, Objective-C, Java, Python, etc.).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of a method to perform the barcode scanning described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A laser scanning device, comprising:
a laser for projecting a light beam;
a mirror optically coupled to the laser, the mirror reflecting the light beam onto a target;
a detector generating an analog signal in response to detecting a reflection of the light beam from the target; and
a processor capable of modifying a scanning parameter that affects a scanning property of the laser scanning device, the processor processing the analog signal to generate a digital bar pattern and embedding the scanning parameter in the digital bar pattern such that the scanning parameter in the digital bar pattern is only extractable by a digital bar pattern decoder that is aware of the presence of the scanning parameter in the digital bar pattern.

2. The laser scanning device of claim 1, further comprising a memory coupled to the processor for storing the scanning parameter.

3. The laser scanning device of claim 1, wherein embedding the scanning parameter in the digital bar pattern comprises appending metadata representing the scanning parameter to the digital bar pattern.

4. The laser scanning device of claim 1, wherein the scanning parameter is chosen from the group comprising scan angle, bar code digitization method, AGC control method, AGC control gain, noise filter type, and cut-off frequency.

5. The laser scanning device of claim 1, wherein the mirror comprises a movable mirror.

6. The laser scanning device of claim 1, wherein the processor comprises an analog to digital (A/D) converter.

7. The laser scanning device of claim 1, wherein the processor comprises a hardware digitizer.

8. The laser scanning device of claim 1, wherein the digital bar pattern with the embedded scanning parameter is decodable by a host that is unaware of the presence of the scanning parameter.

9. The laser scanning device of claim 1, wherein the digital bar pattern with the embedded scanning parameter is decodable by the host that is capable of extracting the scanning parameter.

10. The laser scanning device of claim 9, wherein the host is capable of instructing the processor to modify the scanning parameter in response to decoding the digital bar pattern with the embedded scanning parameter.

11. A system, comprising:
a target;
a scanning device having a scanning parameter that affects a scanning property of the scanning device, the scanning device scanning the target to generate an analog signal, the analog signal being converted to a digital bar pattern that is combined with the scanning parameter, such that the scanning parameter in the digital bar pattern is only extractable by a digital bar pattern decoder that is aware of the presence of the scanning parameter in the digital bar pattern; and
a host comprising the digital bar pattern decoder for extracting the scanning parameter and decoding the digital bar pattern, the host capable of instructing the scanning device to modify the scanning parameter in response to decoding the digital bar pattern.

12. The system of claim 11, wherein the scanning device comprises one of a laser scanning device and a linear imager scanning device.

13. The system of claim 11, further comprising a memory coupled to the scanning device for storing the scanning parameter.

14. The system of claim 11, wherein the scanning parameter is chosen from the group comprising scan angle, bar code digitization method, AGC control method, AGC control gain, noise filter type, and cut-off frequency.

15. The system of claim 11, wherein the host is integrated with the scanning device.

16. The system of claim 11, wherein combining the scanning parameter with the digital bar pattern comprises appending metadata representing the scanning parameter to the digital bar pattern.

17. A method, comprising:
scanning a target with a scanning device having a scanning parameter that affects a scanning property of the scanning device;
generating an analog signal in response to scanning the target;
converting the analog signal to a digital bar pattern;
embedding the scanning parameter in the digital bar pattern such that the scanning parameter in the digital bar pattern is only extractable by a digital bar pattern decoder that is aware of the presence of the scanning parameter in the digital bar pattern;
extracting the scanning parameter from the digital bar pattern;
decoding the digital bar pattern; and
instructing the scanning device to modify the scanning parameter in response to the decoding of the digital bar pattern.

18. The method of claim 17, wherein the scanning device comprises one of a laser scanning device and a linear imager scanning device.

19. The method of claim 17, further comprising modifying the scanning parameter in response to decoding the digital bar pattern with the embedded scanning parameter.

20. The method of claim 17, wherein the scanning parameter is chosen from the group comprising scan angle, bar code digitization method, AGC control method, AGC control gain, noise filter type, and cut-off frequency.

21. The method of claim 17, further comprising storing the scanning parameter in a memory.

22. The method of claim 17, wherein embedding the scanning parameter in the digital bar pattern comprises appending metadata representing the scanning parameter to the digital bar pattern.

\* \* \* \* \*